(12) United States Patent
Lee et al.

(10) Patent No.: US 9,803,071 B2
(45) Date of Patent: *Oct. 31, 2017

(54) THERMOPLASTIC RESIN COMPOSITION FOR INTERIOR MATERIAL OF AUTOMOBILES, AND MOLDED PRODUCT FOR INTERIOR MATERIAL OF AUTOMOBILES

(71) Applicant: LG Hausys, Ltd., Seoul (KR)

(72) Inventors: Yun Ho Lee, Ulsan (KR); Yong Bae Jung, Ulsan (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/415,010

(22) PCT Filed: Dec. 28, 2012

(86) PCT No.: PCT/KR2012/011727
§ 371 (c)(1),
(2) Date: Jan. 15, 2015

(87) PCT Pub. No.: WO2014/017715
PCT Pub. Date: Jan. 30, 2014

(65) Prior Publication Data
US 2015/0183973 A1    Jul. 2, 2015

(30) Foreign Application Priority Data

Jul. 27, 2012  (KR) .................... 10-2012-0082758

(51) Int. Cl.
| | | |
|---|---|---|
| *C08L 23/00* | (2006.01) | |
| *C08L 101/16* | (2006.01) | |
| *C08J 5/18* | (2006.01) | |
| *C08L 23/02* | (2006.01) | |

(52) U.S. Cl.
CPC .............. *C08L 23/00* (2013.01); *C08J 5/18* (2013.01); *C08L 23/02* (2013.01); *C08L 101/16* (2013.01); *C08J 2323/02* (2013.01); *C08J 2401/12* (2013.01); *C08J 2423/06* (2013.01); *C08J 2423/08* (2013.01); *C08J 2423/12* (2013.01); *C08J 2423/20* (2013.01); *C08J 2423/26* (2013.01); *C08L 2205/02* (2013.01); *C08L 2205/03* (2013.01); *C08L 2205/035* (2013.01); *C08L 2312/00* (2013.01)

(58) Field of Classification Search
CPC . C08G 2/08; C08L 59/02; C08L 23/00; C08L 23/02; C08L 101/16; C08L 2205/02; C08L 2312/00; C08L 2205/035; C08L 2205/03; C08J 5/18; C08J 2401/12; C08J 2423/08; C08J 2423/26; C08J 2323/02; C08J 2423/20; C08J 2423/06; C08J 2423/12

See application file for complete search history.

(56) References Cited

U.S. PATENT DOCUMENTS

| | | | | | |
|---|---|---|---|---|---|
| 4,477,327 | A | * | 10/1984 | Cassatta | C08F 299/024 427/501 |
| 5,308,700 | A | * | 5/1994 | Hikasa | C08L 23/10 264/310 |
| 5,602,203 | A | * | 2/1997 | Hamanaka | C08L 23/16 525/194 |
| 2002/0017734 | A1 | * | 2/2002 | Sugihara | B29C 44/3446 264/51 |
| 2008/0249223 | A1 | * | 10/2008 | Yun | C08L 23/10 524/427 |
| 2010/0318012 | A1 | * | 12/2010 | Chhun | D01F 6/60 602/43 |
| 2011/0028631 | A1 | * | 2/2011 | Lawson | C08G 2/08 524/413 |
| 2011/0193007 | A1 | | 8/2011 | Avakian | |
| 2011/0257323 | A1 | | 10/2011 | Hong et al. | |
| 2012/0074027 | A1 | * | 3/2012 | Nagpal | B65D 65/466 206/524.6 |
| 2012/0152794 | A1 | * | 6/2012 | Weisman | A47K 10/421 206/524.6 |
| 2015/0284560 | A1 | * | 10/2015 | Lee | C08L 23/08 428/523 |

FOREIGN PATENT DOCUMENTS

| | | |
|---|---|---|
| CN | 102234393 A | 11/2011 |
| JP | 2008-302545 A | 12/2008 |
| JP | 2009091694 A | 4/2009 |
| JP | 2010121003 A | 6/2010 |
| JP | 2010-285484 A | 12/2010 |
| JP | 2011011678 A | 1/2011 |
| JP | 2012-012586 A | 1/2012 |

(Continued)

OTHER PUBLICATIONS

Engage 8180 Polyolefin Elastomer—Technical Information, Dow Chemical Company, pp. 1-3, Nov. 30, 2000.*
Korean Notice of Allowance dated May 11, 2015 in connection with the counterpart Koren Patent Application No. 10-2012-0082758.
サステナブルバイオによる.軽量自動車部材の開発に関する調査.
International Search Report for PCT/KR2012/011727 dated Apr. 12, 2013.

(Continued)

*Primary Examiner* — Alexander Kollias
(74) *Attorney, Agent, or Firm* — Hauptman Ham, LLP

(57) ABSTRACT

Provided is a thermoplastic resin composition for an interior material of automobiles, comprising a biomass-derived resin. The thermoplastic resin composition for an interior material of automobiles uses a biomass-derived resin, which replaces a petroleum-based thermoplastic resin, so as to reduce the generation of $CO_2$, thereby providing an environmentally friendly effect.

16 Claims, No Drawings

(56) References Cited

FOREIGN PATENT DOCUMENTS

| | | |
|---|---|---|
| JP | 2012076354 A | 4/2012 |
| JP | 2012097189 A | 5/2012 |
| JP | 2013-155225 A | 8/2013 |
| KR | 1020030041499 A | 5/2003 |
| KR | 1020080029543 A | 4/2008 |
| KR | 20090120985 A | 11/2009 |
| KR | 20110020039 A | 3/2011 |
| KR | 20110052245 A | 5/2011 |
| KR | 20110116888 A | 10/2011 |
| WO | 2011/117549 A1 | 9/2011 |

OTHER PUBLICATIONS

Chinese Office Action dated Sep. 21, 2016 in connection with the counterpart Chinese Patent Application No. 201280074929.8.
Japanese Office Action dated Sep. 27, 2016 in connection with the counterpart Japanese Patent Application No. 2015-524166.

* cited by examiner

THERMOPLASTIC RESIN COMPOSITION FOR INTERIOR MATERIAL OF AUTOMOBILES, AND MOLDED PRODUCT FOR INTERIOR MATERIAL OF AUTOMOBILES

CROSS REFERENCE TO RELATED APPLICATION

This application claims the priority of Korean Patent Application No. 10-2012-0082758 filed on Jul. 27, 2012 in the Korean Patent and Trademark Office. Further, this application is the National Phase application of International Application No. PCT/KR2012/011727 filed on Dec. 28, 2012, which is incorporated herein by reference in its entirety.

TECHNICAL FIELD

The present invention relates to a thermoplastic resin composition for automotive interior materials and an automotive interior molded article.

BACKGROUND ART

Since a composition including a thermoplastic resin exhibits outstanding moldability, impact resistance and chemical resistance and has great advantages of low specific gravity and low price, the composition is widely used for plastic molded articles and automotive interior/exterior materials. However, there are problems in that such a composition causes environmental pollution in manufacture of sheets and articles using the composition, and that the composition has great difficulty in disposal due to difficulty in recycling thereof and thus is not environmentally friendly.

Therefore, studies for manufacturing environmentally friendly molded articles to replace environmentally unfriendly synthetic resin sheets and composite sheets are being actively conducted in recent years.

DISCLOSURE

Technical Problem

It is one aspect of the present invention to provide a thermoplastic resin composition for automotive interior materials including a biomass-derived resin replacing petroleum-based thermoplastic resins.

It is another aspect of the present invention to provide an automotive interior molded article manufactured from the thermoplastic resin composition for automotive interior materials.

Technical Solution

In accordance with one aspect of the present invention, a thermoplastic resin composition for automotive interior materials includes a biomass-derived resin.

The thermoplastic resin composition for automotive interior materials may have a pMC value of 10 wt % to 90 wt %, as measured in accordance with ASTM D6866.

The biomass-derived resin may be selected from the group consisting of a polyolefin, thermoplastic polyolefin (TPO), polylactic acid (PLA), cellulose, chitin, starch, thermoplastic starch (TPS), polyhydroxyalkanoates (PHAs), polyvinyl alcohol, polyglycolic acid (PGA), polyethylene terephthalate (PET), polybutylene succinate (PBS), polybutylene terephthalate (PBT), polybutylene adipate terephthalate (PBAT), polybutylene adipate-co-butylene succinate (PBAS), polybutylene adipate-co-butylene succinate terephthalate (PBAST), polytrimethylene terephthalate (PTT), polycaprolactone (PCL), polyamide (PA), polyurethane (PU), poly(ester-amide), poly(ester-urethane), and combinations thereof.

The biomass-derived resin may be prepared from biofuels processed or extracted from one biomass material selected from the group consisting of corn, Jerusalem artichokes, sugar cane, sugar beet, and combinations thereof.

The thermoplastic resin composition for automotive interior materials may further include a resin for mixing selected from the group consisting of polyolefins, polyvinyl chloride, and combinations thereof.

The thermoplastic resin composition for automotive interior materials may include about 1 part by weight to about 900 parts by weight of the resin for mixing, based on 100 parts by weight of the biomass-derived resin.

The thermoplastic resin composition for automotive interior materials may further include one additive selected from the group consisting of plasticizers, inorganic fillers, stabilizers, lubricants, and combinations thereof.

The additive may be present in an amount of about 5 parts by weight to about 100 parts by weight, based on 100 parts by weight of the biomass-derived resin.

In accordance with another aspect of the present invention, an automotive interior molded article includes a sheet manufactured from the thermoplastic resin composition for automotive interior materials as set forth above.

The automotive interior molded article may further include a surface-treated layer.

The surface-treated layer may be formed using an EB curable water-based treatment agent or an EB curable solvent-free treatment agent.

Advantageous Effects

The thermoplastic resin composition for automotive interior materials uses the biomass-derived resin replacing petroleum-based thermoplastic resins and thus can reduce $CO_2$ generation, and the automotive interior molded article is subjected to water-based or solvent-free treatment and thus can reduce volatile organic compounds (VOCs).

BEST MODE

Hereinafter, embodiments of the present invention will be described in detail. However, it should be understood that the present invention is not limited to the following embodiments. The scope of the invention should be defined only by the accompanying claims and equivalents thereof.

In accordance with one aspect of the present invention, a thermoplastic resin composition for automotive interior materials includes a biomass-derived resin. The thermoplastic resin composition for automotive interior materials may be a mixture of the biomass-derived resin and a non-biomass-derived thermoplastic resin.

The biomass-derived resin refers to a resin prepared using biomass as a raw material. For example, biofuels, such as methanol, ethanol, biodiesel fuels and the like, can be obtained through processing or extraction from biomass as biological resources including cereals, such as corn, Jerusalem artichokes, sugar cane, sugar beet, combinations thereof and the like, plants, and the like. The biomass-derived resin is prepared from the biofuels.

In some examples, biomass-derived polyethylene may be obtained by extracting sugars directly from sugar cane and sugar beet, followed by alcohol fermentation. Unlike petroleum-based polyethylene generating carbon dioxide in preparation thereof, the biomass-derived polyethylene resin is produced from bioethanol obtained using sugar cane as a raw material, and there are advantages in that the biomass-derived polyethylene resin is renewable and can significantly reduce generation of carbon dioxide and, rather, allows carbon dioxide in air to be used in preparation thereof.

The biomass-derived resin is an alternative resource capable of replacing chemical fuels generating carbon dioxide, and is an environmentally friendly resin having advantages such as reduction in $CO_2$, and the like, as compared with petroleum-based resins such as typical polyethylene resins, polypropylene resins, and the like.

In addition, the thermoplastic resin composition for automotive interior materials including the biomass-derived resin is also environmentally friendly in that the content of vegetable raw materials and vegetable additives having good compatibility with biomass resins can be increased in preparation of the composition, such as polymerization of the composition, and the like, and in that the biomass-derived resin can be recycled as a thermoplastic resin.

The biomass-derived resin includes resins extracted directly from bio-raw materials as well as resins prepared by copolymerization of the bio-raw material with a non-biomass-derived monomer or prepared using materials extracted from the bio-raw materials as a raw material.

As such, even though the composition includes the same amount of the biomass-derived resin, the composition includes different amounts of biomass-extracted components when the biomass-derived resin is a material purely extracted from the aforementioned bio-raw materials and when the biomass-derived resin is obtained by reacting a material, which is used as a raw material and extracted from the bio-raw materials, with another compound.

The amount of the biomass-extracted components in the thermoplastic resin composition for automotive interior materials can be evaluated as to pMC (percent modern carbon) value in accordance with ASTM D6866.

The pMC value can be measured or calculated by carbon dating, since an amount of carbon isotope $^{14}C$ is different between a bio-raw material and a petroleum raw material.

The pMC value of the thermoplastic resin composition for automotive interior materials can be adjusted depending upon the amount of the biomass-derived resin as well as the kind of biomass-derived resin to be used.

The thermoplastic resin composition for automotive interior materials may have a pMC value of about 10 wt % to about 90 wt %. Within this range, the thermoplastic resin composition can realize suitable properties for automotive interior materials while exhibiting environmental friendliness.

Examples of the biomass-derived resin may include polyolefins such as polyethylene, polypropylene and the like, thermoplastic polyolefin (TPO), polylactic acid (PLA), cellulose, chitin, starch, thermoplastic starch (TPS), polyhydroxyalkanoates (PHAs), polyvinyl alcohol, polyglycolic acid (PGA), polyethylene terephthalate (PET), polybutylene succinate (PBS), polybutylene terephthalate (PBT), polybutylene adipate terephthalate (PBAT), polybutylene adipate-co-butylene succinate (PBAS), polybutylene adipate-co-butylene succinate terephthalate (PBAST), polytrimethylene terephthalate (PTT), polycaprolactone (PCL), polyamide (PA), polyurethane (PU), poly(ester-amide), poly(ester-urethane), combinations thereof, and the like.

As described above, the biomass-derived resin may be a resin, such as PLA and PHA, which is obtained by direct extraction from biomass, and may be a resin, such as: PBS, PBT, PBAS, PBAT and PBAST prepared from biomass-derived 1,4-butanediol as a raw material; PET prepared from biomass-derived ethylene glycol; PTT prepared from biomass-derived 1,3-propanediol; and TPS prepared from biomass-derived starch, glucose or lactose, which is prepared by mixing a biomass-derived raw material with another material.

The thermoplastic resin composition for automotive interior materials may further include a resin for mixing, which is mixed with the biomass-derived resin. As described above, the resin for mixing may be the non-biomass-derived thermoplastic resin.

The thermoplastic resin composition for automotive interior materials may allow types and amounts of resins, which are included as components therein, to be determined based on purposes of the composition. For example, the resin for mixing may be present in an amount of about 1 part by weight to about 900 parts by weight, based on 100 parts by weight of the biomass-derived resin.

The thermoplastic resin composition for automotive interior materials is an environmentally friendly composition by including the biomass-derived resin instead of petroleum-based resins. In addition, similar to adjustment of properties of the composition by blending a petroleum-based resin, the thermoplastic resin composition may realize desired properties by blending the resin for mixing in an appropriate ratio.

When the thermoplastic resin composition for automotive interior materials includes an increased amount of the biomass-derived resin, the composition can suffer from deterioration in properties having a trade-off relationship due to the increased amount. This problem can be supplemented by appropriate adjustment of the content of the resin for mixing.

In one embodiment, the thermoplastic resin composition for automotive interior materials includes: 100 parts by weight of biomass-derived polyethylene; about 300 parts by weight to about 500 parts by weight of partially crosslinked thermoplastic polyolefin (TPO); about 10 parts by weight to about 200 parts by weight of non-crosslinked TPO; about 100 parts by weight to about 200 parts by weight of polypropylene; about 100 parts by weight to about 200 parts by weight of an ethylene-octene rubber (EOR); and about 100 parts by weight to about 200 parts by weight of inorganic fillers.

In another embodiment, the thermoplastic resin composition for automotive interior materials includes: 100 parts by weight of biomass-derived polylactic acid; about 100 parts by weight to about 200 parts by weight of biomass-derived polyethylene; about 100 parts by weight to about 200 parts by weight of a compatibilizer; about 100 parts by weight to about 900 parts by weight of partially crosslinked biomass-derived TPO; and about 100 parts by weight to about 200 parts by weight of inorganic fillers.

In a further embodiment, the thermoplastic resin composition for automotive interior materials includes: 100 parts by weight of a biomass-derived polyester; about 100 parts by weight to about 200 parts by weight of biomass-derived polylactic acid; about 100 parts by weight to about 200 parts by weight of polyvinyl chloride; about 50 parts by weight to about 200 parts by weight of a plasticizer produced from oil extracted from animals and plants; and about 50 parts by weight to about 100 parts by weight of an inorganic filler.

Hereinafter, the resins disclosed as examples capable of being used as the resin for mixing will be described in detail.

Specifically, the polyolefin may include polyethylene, polypropylene, and the like, and may be a polymer, an oligomer, an elastomer-phase rubber, or mixtures thereof.

The polyolefin in the form of the elastomer-phase rubber may be used for reinforcement of impact resistance, and may be, for example, a copolymer of ethylene and a $C_2$ to $C_{10}$ α-olefin. Here, the α-olefin may be any α-olefin without limitation. As an example, the α-olefin may include one selected from the group consisting of propylene, butene, pentene, hexene, propene, octene, and combinations thereof. In another example, the polyolefin in the form of the elastomer-phase rubber may include at least one selected from the group consisting of ethylene-propylene rubber (EPR), ethylene-propylene-diene rubber (EPDM), ethylene-butene rubber (EBR), ethylene-octene rubber (EOR), and combinations thereof.

The ethylene-octene rubber (EOR) is a resin capable of being used to resolve a drawback of the thermoplastic polyolefin resin, which may be used as the resin for mixing. Although the EOR has low melt strength, since the EOR is included in conjunction with the inorganic fillers and thus impregnated into the inorganic fillers, the composition can exhibit similar melt strength to that of the thermoplastic polyolefin resin and have an effect of odor improvement.

A grade of EOR is divided based on octene content, and a high octene content causes deterioration in hardness of the EOR, thereby causing deterioration in calendering processability despite improvement in softness. Thus, the octene content may be adjusted according to the purpose thereof.

The polyolefin resin is a thermoplastic resin and may be used in the form of at least one of completely crosslinked, semi-crosslinked and non-crosslinked resins. The thermoplastic polyolefin (TPO) can improve melt strength required for the thermoplastic resin composition for automotive interior materials when calendering is applied to the composition. In addition, to allow the composition to secure appropriate sagging upon vacuum molding, a completely crosslinked TPO resin and a semi-crosslinked TPO resin may be separately used depending upon degree of crosslinking. Since the semi-crosslinked TPO resin can form a structure in which a polyolefin chain is present between semi-crosslinked rubbers, the semi-crosslinked TPO resin is uniformly stretched upon stretching and thus can allow a molded article to have a reduced thickness deviation. The completely crosslinked TPO resin may be used to prevent a problem caused by overly high elongation of a bio-resin composition, or to prevent deterioration in trimmability of the molded article.

For example, among polyolefin resins, the polypropylene resin may be used to improve shape maintenance of a molded article after the thermoplastic resin composition for automotive interior materials is subjected to calendaring. The composition includes the polypropylene resin in an appropriate amount to secure an appropriate level of melt strength, can exhibit improved moldability upon processing of the molded article, to prevent rupturing upon vacuum molding, to improve texture of the article by realizing appropriate strength of the molded article, and to improve appearance of the article.

Since polyvinyl chloride is used together with the plasticizer produced from oil extracted from animals and plants, the composition can be formed into an article which is much more environmentally friendly than existing articles and is suitable even for immune-deficient infants.

Properties of the thermoplastic resin composition for automotive interior materials may be adjusted through addition of additives commonly known in the art. For example, the composition may further include one additive selected from the group consisting of plasticizers, inorganic fillers, photo-stabilizers, heat stabilizers, antioxidants, lubricants, flame retardants, antimicrobials, anti-hydrolysis agents, and combinations thereof. For example, the additive may be present in an amount of about 5 parts by weight to about 100 parts by weight, based on 100 parts by weight of the biomass-derived resin.

For example, the inorganic fillers may be used to improve mechanical properties of the molded article formed from the thermoplastic resin composition for automotive interior materials, and may include at least one selected from among calcium carbonate, calcium oxide, mica, talc, and the like.

In one embodiment, the thermoplastic resin composition for automotive interior materials includes: 100 parts by weight of biomass-derived polyethylene; about 300 parts by weight to about 500 parts by weight of the partially cross-linked thermoplastic polyolefin (TPO); about 10 parts by weight to about 200 parts by weight of the non-crosslinked TPO; about 100 parts by weight to about 200 parts by weight of polypropylene; about 100 parts by weight to about 200 parts by weight of the ethylene-octene rubber (EOR); and about 100 parts by weight to about 200 parts by weight of the inorganic fillers.

In another embodiment, the thermoplastic resin composition for automotive interior materials includes: 100 parts by weight of biomass-derived polylactic acid; about 100 parts by weight to about 200 parts by weight of biomass-derived polyethylene; about 100 parts by weight to about 200 parts by weight of the compatibilizer; about 100 parts by weight to about 900 parts by weight of the partially cross-linked biomass-derived TPO; and about 100 parts by weight to about 200 parts by weight of the inorganic fillers.

In a further embodiment, the thermoplastic resin composition for automotive interior materials includes: 100 parts by weight of the biomass-derived polyester; about 100 parts by weight to about 200 parts by weight of biomass-derived polylactic acid; about 100 parts by weight to about 200 parts by weight of polyvinyl chloride; about 50 parts by weight to about 200 parts by weight of the plasticizer produced from oil extracted from animals and plants; and about 50 parts by weight to about 100 parts by weight of the inorganic fillers.

In accordance with another aspect of the present invention, an automotive interior molded article includes a sheet manufactured from the above thermoplastic resin composition for automotive interior materials. As described above, since the automotive interior molded article is manufactured using a biomass-derived resin and thus does not use resins prepared from petroleum-based raw materials, the automotive interior molded article can realize an environmentally friendly effect of reducing $CO_2$.

The automotive interior molded article may further include a surface-treated layer. The surface-treated layer may be formed of a surface treatment agent. The surface treatment agent may include oil-based, water-based, solvent-free treatment agents and the like depending upon types of solvents, and may include thermally curable, UV curable, EB curable treatment agents, and the like depending upon curing methods. The surface-treated layer may be formed by any method known in the art. However, since the oil-based treatment agent can cause a problem of increase in emission of total volatile organic compounds (TVOCs) and formaldehyde, the automotive interior molded article can be made more environmentally friendly by forming the surface-treated layer using a treatment agent which is a water-based or solvent-free treatment agent and is cured by irradiation of electron beams (EB).

The automotive interior molded article may be formed by any method known in the art. The automotive interior molded article may be manufactured by a method for molding a thermoplastic resin composition known in the art using the thermoplastic resin composition for automotive interior materials as set forth above.

For example, a mixture prepared by mixing resin components of the thermoplastic resin composition for automotive interior materials is melted and subjected to calendering via calender rolls, thereby manufacturing the automotive interior molded article.

The mixture may be melted by a typical method using single-screw extruders, twin-screw extruders, kneaders, Banbury mixers, and the like. Calendering may be performed using a typical method known in the art.

Specifically, the mixture may be melted at about 160° C. to about 180° C. The molten mixture may be subjected to calendering via the calender rolls having a surface temperature from about 130° C. to about 180° C.

When the automotive interior molded article further includes the surface-treated layer, the surface treatment agent is coated onto a surface of the sheet manufactured from the thermoplastic resin composition for automotive interior materials, followed by surface treatment, for example, by irradiation with electron beams, thereby forming the surface-treated layer. When the surface-treated layer is formed by electron beam irradiation, since the surface treatment agent is polymerized and solidified due to generation of radicals by electron beam irradiation, there is no need for polymerization initiators and the like, unlike thermal curing and UV curing, and there is almost no concern of change in quality. In addition, since EB curing provides high energy utilization efficiency and fast curing rate, improvement in productivity can be expected.

The surface treatment agent may be an oil-based or water-based treatment agent, and the surface treatment agent, which can be cured by electron beam irradiation, may include melamine resins, epoxy resins, rubber-based resins, acrylic resins, ester resins, urethane resins, and mixtures thereof.

For example, when surface treatment is performed using an acrylic polymer, the plasticizer is prevented from migration and the article has improved surface strength, whereby the automotive interior molded article can exhibit excellent durability.

Since the surface-treated layer subjected to surface treatment by electron beam irradiation improves elongation of the automotive interior molded article, the automotive interior molded article does not suffer from breakage and deterioration in light resistance and heat resistance even after molding from the thermoplastic resin composition for automotive interior materials. In addition, unlike UV curing and thermal curing using benzene, toluene or the like as a solvent, since electron beam curing does not use a solvent causing emission of environmentally harmful elements such as VOCs and the like, surface treatment by electron beam irradiation can improve environmental friendliness of the automotive interior molded article by inclusion of the biomass-derived resin.

Since the automotive interior molded article includes the environmentally friendly biomass-derived resin while exhibiting excellent properties in terms of solvent resistance, abrasion resistance, scratch resistance, light resistance, chemical resistance and the like, the automotive interior molded article does not cause odor in automobiles, and is used as cover materials of automotive interior parts and thus can improve an indoor mood of the automobiles.

Hereinafter, the present invention will be described in more detail with reference to some examples. It should be understood that these examples are provided for illustration only and are not to be construed in any way as limiting the present invention.

EXAMPLES

Examples 1 to 8 and Comparative Examples 1 to 2

In Examples 1 to 8 and Comparative Examples 1 to 2, compositions were prepared according to components and amounts as listed in Tables 1 and 2 using the following compounds. Each of the compositions used in Examples 1 to 8 and Comparative Examples 1 to 2 was measured as to pMC value in accordance with ASTM D6866. Measurement results are shown in Tables 1 and 2.

Each of the mixed compositions was melted and subjected to calendering, wherein the molten mixture was passed through a gap between calender rolls for compression, thereby manufacturing a sheet.

An EB curable water-based treatment agent as a surface treatment agent was coated onto a surface of each of the manufactured sheets using a sprayer, followed by forming a surface-treated layer by curing the surface treatment agent, thereby preparing a specimen of an automotive interior molded article.

Compounds Used in Examples and Comparative Examples

Completely crosslinked TPO resin: N65EH, Hwaseung R&A Co., Ltd.
Partially crosslinked TPO resin: 8165N, Hyundai EP Co., Ltd.
Non-crosslinked TPO resin: Q100F, Baselle Co., Ltd.
Ethylene-octene rubber: Engage8180, DOW Co., Ltd.
Polypropylene resin: B330F, SK Energy Co., Ltd.
Polyethylene resin: SF 316, Lotte Chemical Co., Ltd.
Biomass-derived thermoplastic polyolefin (TPO) prepared: Shore Hardness A 80, Specific gravity: 0.93, Tensile strength: 11 MPa, Elongation: 560%
Biomass-derived polyethylene (PE) prepared: Melt flow index (MI): 1.0 (190° C./2.16 kg), Specific gravity: 0.92, Tensile strength: 40 MPa, Elongation: 1400%
Compatibilizer: WD203, SUMITOMO Co., Ltd.
Polylactic acid (PLA): 2002D, NatureWorks Co., Ltd.
Polyhydroxyalkanoate (PHA): EM10051, Ecoman Co., Ltd.
Cellulose: CA-398-6, EASTMAN Co., Ltd.
Inorganic filler: Calcium carbonate

TABLE 1

| Component | | Example (parts by weight) | | | | |
|---|---|---|---|---|---|---|
| | | 1 | 2 | 3 | 4 | 5 |
| Biomass-derived resin | TPO | 100 | 80.7 | 66.2 | 79.7 | 67.4 |
| | PE | — | — | 33.8 | 20.3 | 32.6 |
| | PLA | — | 19.3 | — | — | — |
| | PHA | — | — | — | — | — |
| | Cellulose | — | — | — | — | — |
| | Total | 100 | 100 | 100 | 100 | 100 |
| Completely crosslinked TPO | | 64.3 | 50 | 9.2 | 6.3 | — |
| Partially crosslinked TPO | | 357.1 | 161.5 | 29.2 | — | — |
| Non-crosslinked TPO | | 57.1 | — | — | — | 4.5 |
| Ethylene-octene rubber (EOR) | | 71.4 | 30.7 | — | — | — |
| Polypropylene | | 28.6 | — | 7.7 | 7.6 | 3.4 |
| Polyethylene | | — | — | — | — | — |
| Compatibilizer | | — | 19.2 | — | — | — |
| (Sum of resins for mixing) | | (578.5) | (261.4) | (46.1) | (13.9) | (7.9) |
| Inorganic filler | | 35.7 | 23.1 | 7.7 | 8.9 | 4.5 |
| pMC | | 13 wt % | 25 wt % | 43 wt % | 52 wt % | 58 wt % |

TABLE 2

| Component | | Example (parts by weight) | | | Comparative Example (wt %) | |
|---|---|---|---|---|---|---|
| | | 6 | 7 | 8 | 1 | 2 |
| Biomass-derived resin | TPO | 67.9 | 65.9 | 61.1 | — | — |
| | PE | 32.1 | 28.4 | 33.3 | — | — |
| | PLA | — | — | — | — | — |
| | PHA | — | 5.7 | — | — | — |
| | Cellulose | — | — | 5.6 | — | — |
| | Total | 100 | 100 | 100 | — | — |
| Completely crosslinked TPO | | 2.4 | — | — | 5 | 10 |
| Partially crosslinked TPO | | 4.8 | — | — | 25 | 10 |
| Non-crosslinked TPO | | 3.6 | 5.7 | — | 25 | 38 |
| Ethylene-octene rubber (EOR) | | — | — | — | 5 | 4 |
| Polypropylene | | 4.8 | — | — | 25 | 24 |
| Polyethylene | | — | — | — | 5 | 4 |
| Compatibilizer | | — | 5.7 | 5.6 | — | — |
| (Sum of resins for mixing) | | (15.6) | (11.4) | (5.6) | | |
| Inorganic filler | | 3.6 | 2.3 | 5.6 | 10 | 10 |
| pMC | | 65 wt % | 72 wt % | 79 wt % | Total (100 wt %) 0 | Total (100 wt %) 0 |

Experimental Example 1

Hardness

Hardness was measured in accordance with ASTM D2240. Results are shown in Tables 4 and 5.

Experimental Example 2

Tensile Strength and Elongation at Break

A maximum load for a certain area and elongation at break were measured at a test speed of 200 mm/min and at a gauge length of 70 mm using Type 1 specimen and a tensile tester in accordance with ASTM D 638.

Experimental Example 3

Heat Aging Resistance

A specimen was kept in a forced convection oven at a temperature of 110±2° C. for 300 hours, followed by determination of ΔEcmc at an angle of 45° and color change with the naked eye based on the gray scale according to ISO 105-A02 using a spectrophotometer, thereby evaluating a grade.

Experimental Example 4

Light Aging Resistance

A specimen was subjected to light irradiation at an intensity of 126 mJ/m$^2$ at a black panel temperature of 89±3° C. and a humidity of 50±5% RH using a tester in accordance with ISO 105, followed by determination of color change with the naked eye based on the gray scale according to ISO 105-A02, thereby evaluating a grade.

Experimental Example 5

Chemical Resistance

A surface of a specimen was rubbed back and forth 10 times with a piece of gauze sufficiently wetted in the test liquids listed in Table 3, and left at room temperature for 1 hour. Next, color change was determined with the naked eye based on the gray scale according to ISO 105-A02, thereby evaluating a grade.

TABLE 3

| Test liquid | Remarks |
|---|---|
| Glass cleaner | Alkalescent glass cleaner |
| Cleaner | Mixed liquid of 95% distilled water and 5% neutral detergent |
| Washer liquid | Mixed liquid of 50% isopropyl alcohol and 50% distilled water |
| Gasoline | Unleaded gasoline |
| Polishing wax | HMC |

Experimental Example 6

Sunscreen Resistance

In accordance with GMN 10033, two sheets of white cotton cloth having the same size were placed on an aluminum plate (50 mm×50 mm), and 0.25 g of a sunscreen (Coppertone Waterbabies SPF 45) was coated onto a front surface thereof. Next, the coated aluminum plate was placed on a test specimen and brought into close contact therewith by applying a load of 500 g to the aluminum plate. Next, the white cotton cloth and the aluminum plate were removed from the specimen, which in turn was placed in a thermostat at 80±2° C. for about 10 to 15 minutes and left at room temperature. Then, the test specimen was washed with a neutral detergent, dried, and determined as to color change with the naked eye. The test specimen was rated as Excellent when suffering from almost no color change; the test specimen was rated as Good when suffering from insignificant color change; the test specimen was rated as Normal when exhibiting no abnormality in quality although suffering from color change; and the test specimen was rated as Poor when suffering from severe color change.

Experimental Example 7

Odor

A 4 L glass container was heated to 100° C. for about 1 hour and left at room temperature for 1 hour to release volatile compounds from the glass container. Next, the specimen was cut into a size of 50 mm×60 mm, heated to 100° C. in the glass container for 2 hours, and then removed from the glass container. Next, the specimen was left at room temperature (23±2° C.) for 60 minutes for cooling, followed by opening a lid of the glass container by about 3 cm to about 4 cm, thereby evaluating an odor of the specimen. The odor was scored as follows: a severe odor was given 1 point; a normal odor was given 3 points; and almost no odor was given 5 points.

Experimental Example 8

Calendering Processability

A sheet for each blend was produced using a calendering machine in which a bio-molding composition was melted and compressed between rolls and then processed into a sheet form. Then, the sheet was observed with the naked eye to determine workability and surface state. The sheet was determined as Poor when un-melted resins remain on the surface thereof or the sheet had a non-uniform surface due to deterioration in flowability.

Results of properties measured on each of the specimens of the automotive interior molded articles manufactured in Examples 1 to 8 and Comparative Examples 1 to 2 are shown in Tables 4 and 5.

TABLE 4

|  | Example | | | | |
|---|---|---|---|---|---|
| Properties | 1 | 2 | 3 | 4 | 5 |
| Hardness [Shore A] | 80 | 82 | 82 | 77 | 78 |
| Specific gravity | 0.92 | 0.93 | 0.91 | 0.92 | 0.91 |
| Tensile strength (kgf/cm$^2$) | 142 | 191 | 164 | 164 | 117 |
| Elongation at break (%) | 650 | 591 | 572 | 572 | 621 |
| Heat aging resistance (gray scale) | 4 | 4 | 4 | 4 | 4 |
| Light aging resistance (gray scale) | 4 | 4 | 4 | 4 | 4 |
| Chemical resistance (gray scale) | 4 | 4 | 4 | 4 | 4 |
| Sunscreen resistance | Good | Good | Good | Good | Good |
| Odor (grade) | 4 | 4 | 4 | 4 | 4 |
| Calendering processability | Good | Good | Good | Good | Good |

TABLE 5

|  | Example | | | Comparative Example | |
|---|---|---|---|---|---|
| Properties | 6 | 7 | 8 | 1 | 2 |
| Hardness [Shore A] | 79 | 81 | 84 | 81 | 79 |
| Specific gravity | 0.92 | 0.93 | 0.93 | 0.92 | 0.92 |
| Tensile strength (kgf/cm$^2$) | 202 | 236 | 201 | 124 | 130 |

TABLE 5-continued

| Properties | Example | | | Comparative Example | |
|---|---|---|---|---|---|
| | 6 | 7 | 8 | 1 | 2 |
| Elongation at break (%) | 689 | 762 | 723 | 620 | 695 |
| Heat aging resistance (gray scale) | 4 | 4 | 4 | 4 | 4 |
| Light aging resistance (gray scale) | 4 | 4 | 4 | 4 | 4 |
| Chemical resistance (gray scale) | 4 | 4 | 4 | 4 | 4 |
| Sunscreen resistance | Good | Good | Good | Good | Good |
| Odor (grade) | 4 | 4 | 4 | 3 | 3 |
| Calendering processability | Good | Good | Good | Good | Good |

It could be confirmed from the results that the specimens of the automotive interior molded articles manufactured in Examples 1 to 8 realized properties equal to or higher than the specimens of Comparative Examples 1 to 2, which were prepared using only the petroleum-based resins, while securing environmental friendliness due to use of the biomass-derived resins.

The invention claimed is:

1. A thermoplastic resin composition for automotive interior materials, comprising:
  a biomass-derived resin and a non-biomass-derived resin for mixing,
  wherein the non-biomass-derived resin for mixing comprises a polyolefin in a form of an elastomer-phase rubber, polypropylene, and thermoplastic polyolefin (TPO),
  wherein the polyolefin in the form of an elastomer-phase rubber comprises a copolymer of ethylene and a $C_2$ to $C_{10}$ α-olefin, and
  wherein the TPO comprises a completely crosslinked TPO resin, a semi-crosslinked TPO resin and non-crosslinked TPO resins.

2. The thermoplastic resin composition according to claim 1, wherein the thermoplastic resin composition for automotive interior materials has a percent modern carbon (pMC) value of 10 wt % to 90 wt %, as measured in accordance with ASTM D6866.

3. The thermoplastic resin composition according to claim 1, wherein the biomass-derived resin further comprises one selected from the group consisting of a polyolefin, polylactic acid (PLA), cellulose, chitin, starch, thermoplastic starch (TPS), polyhydroxyalkanoates (PHAs), polyvinyl alcohol, polyglycolic acid (PGA), polyethylene terephthalate (PET), polybutylene succinate (PBS), polybutylene terephthalate (PBT), polybutylene adipate terephthalate (PBAT), polybutylene adipate-co-butylene succinate (PBAS), polybutylene adipate-co-butylene succinate terephthalate (PBAST), polytrimethylene terephthalate (PTT), polycaprolactone (PCL), polyamide (PA), polyurethane (PU), poly(ester-amide), poly(ester-urethane), and combinations thereof.

4. The thermoplastic resin composition according to claim 1, wherein the biomass-derived resin is prepared from biofuels processed or extracted from one biomass material selected from the group consisting of corn, Jerusalem artichokes, sugar cane, sugar beet, and combinations thereof.

5. The thermoplastic resin composition according to claim 1, further comprising:
  a resin for mixing selected from the group consisting of polyolefins, polyvinyl chloride, and combinations thereof.

6. The thermoplastic resin composition according to claim 5, comprising:
  1 part by weight to 900 parts by weight of the non-biomass-derived resin for mixing, based on 100 parts by weight of the biomass-derived resin.

7. The thermoplastic resin composition according to claim 1, further comprising:
  one additive selected from the group consisting of plasticizers, inorganic fillers, stabilizers, lubricants, and combinations thereof.

8. The thermoplastic resin composition according to claim 7, wherein the additive is present in an amount of 5 parts by weight to 100 parts by weight, based on 100 parts by weight of the biomass-derived resin.

9. An automotive interior molded article comprising:
  a sheet manufactured from the thermoplastic resin composition for automotive interior materials according to claim 1.

10. The automotive interior molded article according to claim 9, further comprising:
  a surface-treated layer.

11. The automotive interior molded article according to claim 10, wherein the surface-treated layer is formed using an electron beam curable water-based treatment agent or an electron beam curable solvent-free treatment agent.

12. The thermoplastic resin composition according to claim 1, wherein the polyolefin in the form of the elastomer-phase rubber comprises ethylene-propylene rubber (EPR).

13. The thermoplastic resin composition according to claim 1, wherein the polyolefin in the form of the elastomer-phase rubber comprises ethylene-propylene-diene rubber (EPDM).

14. The thermoplastic resin composition according to claim 1,
  wherein the polyolefin in the form of the elastomer-phase rubber comprises ethylene-butene rubber (EBR).

15. The thermoplastic resin composition according to claim 1,
  wherein the polyolefin in the form of the elastomer-phase rubber comprises ethylene-octene rubber (EOR).

16. The thermoplastic resin composition according to claim 1, wherein the polyolefin in the form of the elastomer-phase rubber comprises ethylene-propylene rubber (EPR), ethylene-propylene-diene rubber (EPDM), ethylene-butene rubber (EBR), and ethylene-octene rubber (EOR).

* * * * *